(12) United States Patent
Li et al.

(10) Patent No.: US 9,213,492 B2
(45) Date of Patent: Dec. 15, 2015

(54) SD MEMORY CARD

(75) Inventors: Zhixiong Li, Guangdong (CN); Weiwen Pang, Guangdong (CN); Ping Wang, Guangdong (CN)

(73) Assignee: SHENZHEN NETCOM ELECTRONICS CO., LTD., Guangdong (CN)

( * ) Notice: Subject to any disclaimer, the term of this patent is extended or adjusted under 35 U.S.C. 154(b) by 307 days.

(21) Appl. No.: 13/982,704

(22) PCT Filed: Aug. 31, 2011

(86) PCT No.: PCT/CN2011/079165
§ 371 (c)(1),
(2), (4) Date: Jul. 30, 2013

(87) PCT Pub. No.: WO2013/023390
PCT Pub. Date: Feb. 21, 2013

(65) Prior Publication Data
US 2013/0311720 A1    Nov. 21, 2013

(30) Foreign Application Priority Data

Aug. 17, 2011   (CN) .......................... 2011 1 0236369

(51) Int. Cl.
*H01R 25/00*   (2006.01)
*G06F 3/06*    (2006.01)
*G06K 19/077*  (2006.01)

(52) U.S. Cl.
CPC .............. *G06F 3/062* (2013.01); *G06F 3/0655* (2013.01); *G06F 3/0679* (2013.01); *G06K 19/07732* (2013.01); *G06K 19/07741* (2013.01)

(58) Field of Classification Search
CPC . H05K 1/11; G06K 19/07732; G06K 19/077; G06K 13/085; H01R 12/57; H01R 27/02; H01R 24/64; H01R 13/6485; H01R 13/44; H01R 12/88; G06F 3/062
USPC ......................................................... 439/638
See application file for complete search history.

(56) References Cited

U.S. PATENT DOCUMENTS 7,310,692 B2 * 12/2007 Miller et al. .................... 710/11
7,364,090 B2 *  4/2008 Cuellar et al. ................ 235/492

(Continued)

FOREIGN PATENT DOCUMENTS

CN           1947134 A     4/2007

*Primary Examiner* — Jean F Duverne
(74) *Attorney, Agent, or Firm* — Birch, Stewart, Kolasch & Birch, LLP (57) ABSTRACT

The present invention relates to an SD memory card, including an SD card adapter and a memory card. One end of the SD card adapter is provided with an SD interface, and the other end is provided with a receiving groove. Both ends of the memory card are respectively provided with a set of SDIO interface contacts and a USB interface. The memory card can be inserted into the receiving groove to electrically connect the set of SDIO interface contacts and the SD interface. When the memory card of the SD memory card is inserted into the receiving groove of the SD card adapter, the SD interface of the SD card adapter is electrically conducted with the set of SDIO interface contacts of the memory card, for the SD card adapter to be inserted into the SD slot to serve as an ordinary SD memory card; when the memory card of the SD memory card is unplugged of the receiving groove of the SD card adapter, the set of USB interfaces of the memory card can be inserted into the USB slot to serve as an ordinary USB storage device. Hence, the SD memory card can be electrically connected with the USB connection port without the help of a multi-functional card reader.

20 Claims, 10 Drawing Sheets

(56) References Cited

U.S. PATENT DOCUMENTS

| | | | |
|---|---|---|---|
| 7,491,076 B2 * | 2/2009 | Gu et al. | 439/217 |
| 7,710,736 B2 * | 5/2010 | Middlekauff et al. | 361/737 |
| 8,550,858 B2 * | 10/2013 | Reid | 439/639 |
| 8,982,567 B2 * | 3/2015 | Bang et al. | 361/737 |
| 2005/0230484 A1 | 10/2005 | Cuellar et al. | |
| 2008/0030963 A1 | 2/2008 | Middlekauff et al. | |

* cited by examiner

FIG. 10

SD MEMORY CARD

FIELD OF THE INVENTION

The present invention relates to a data storage card, and more particularly relates to an SD (secure digital) memory card which is compatible with the USB interface.

BACKGROUND OF THE INVENTION

With the rising popularity of electronic products, the memory card, accompanied with the use of the electronic products, not only has a significant promotion in storage capacity in the manufacturing technology thereof, but also has a significant improvement in the aspect of practicality, the memory card provides a better compatibility such that it is more convenient in the practical application for consumers. For example, the specifications of the standard interface of the current memory card contain the kinds of CF, SD, MS etc., a single standard interface is formed on the early card for connecting to the corresponding reader device, however, since there are a variety of specifications of the memory card on the market, in order to adapt to such a variety of specifications, a multi-function card reader so called "all in one" is developed.

Take the SD memory card for example, according to the standard protocols, the shape of the connecting finger of the SD connect port is completely different from the shape of the connecting finger of the USB interface port, if it needs to be compatible with different connection port, such as the SD interface and the USB interface, the multi-function card reader is needed.

SUMMARY OF THE INVENTION

It is an object of the present invention to provide an SD memory card being electrically connected to the USB interface port without using a multi-function card reader.

An SD memory card includes an SD card adapter, one end of the SD card adapter is provided with an SD interface, the other end of the SD card adapter defines a receiving groove; and a memory card, two ends of the memory card are provided with a set of SDIO (Secure Digital Input and Output) interface contacts and a USB interface, respectively, the memory card is received in the receiving groove such that the set of SDIO interface contacts are electrically connected to the SD interface.

Further, the memory card comprises an integrated circuit packaged therein configured for storing data.

Further, the SD card adapter includes an upper cover, one end of the upper cover defines a plurality of spaced connecting grooves, the other end of the upper cover defines a first gap; a lower cover, one end of the lower cover defines a second gap corresponding to the first gap; and a plug connector, one side of the plug connector is provided with a plurality of spaced metal strips, the other side of the plug connector is provided with a set of SD connecting fingers, the set of SD connecting fingers are fixed to the plug connector and electrically connected to the plurality of the metal strips; the set of SD connecting fingers are clamped between the upper cover and the plug connector, and the set of SD connecting fingers are corresponding to arrange in the plurality of spaced connecting grooves to form the SD interface; the first gap and the second gap cooperatively form the receiving groove.

Further, the memory card includes an outer frame; a memory module, the memory module is fixed inside of the outer frame, one end of memory module is provided with a set of USB connecting fingers, the set of SDIO interface contacts are positioned on the other end of the memory module; a cover plate fixed to the end of the memory module having the set of USB connecting fingers, the cover plate defines a set of through holes corresponding to the set of USB connecting fingers at a middle portion thereof; and a set of USB interface contacts, the set of USB interface contacts are received in the set of through holes of the cover plate and are electrically connected to the set of USB connecting fingers to form the USB interface.

Further, the memory card includes a memory module, one end of the memory module is provided with a set of USB connecting fingers to form the USB interface, the set of SDIO interface contacts are positioned on the other end of the memory module; and a cover plate, one end of the cover plate is rotatably connected to the end of the memory module having the set of USB connecting fingers, the cover plate is capable of rotating from one side of the memory module to the other.

Further, the memory card includes an outer frame; a memory module, the memory module is fixed inside of the outer frame, one end of memory module is provided with a set of USB connecting fingers to form the USB interface, the set of SDIO interface contacts are positioned on the other end of the memory module; and a cover plate, one end of the cover plate is rotatably connected to the end of the outer frame adjacent to the set of USB connecting fingers, the cover plate is capable of rotating from one side of the memory module to the other.

Further, the cover plate is rotatably connected to the outer frame via a rotating shaft assembly, the end faces of both the cover plate and the outer frame are provided with two lugs spacing to each other, the lug defines a shaft hole.

Further, the rotating shaft assembly includes two connection blocks and four rotary shafts fixing to the two connection blocks, respectively, two rotary shafts located on each connection block extends through the shaft holes of the two adjacent lugs, respectively.

Further, each of the two sides of the end of the cover plate away from the rotating shaft assembly is provided with a latching portion, each of the opposite sides of the outer frame is provided with a mating portion, the latching portion is latched with the mating portion such that the cover plate covers the set of USB connecting fingers.

Further, the side of the cover plate corresponding to the set of USB connecting fingers defines a notch and is provided with a resilient sealing portion surrounding a periphery of the notch, the resilient sealing portion elastically resists against the outer frame or the memory module.

Further, each of two opposite sidewalls of the receiving groove defines a sliding slot, each of two opposite sidewalls of the end of the outer frame adjacent to the set of SDIO interface contacts is provided with a guide protrusion slidably received in the sliding slot.

Further, each of two opposite sidewalls of the opening end of the receiving groove defines a latching groove, each of two opposite sidewalls of the end of the cover plate away from the guide protrusion is provided with an engaging protrusion engaging with the latching groove.

An SD memory card includes an SD card adapter, one end of the SD card adapter is provided with an SD interface, and the other end of the SD card adapter defines a receiving groove, and a memory card electrically connected to the SD interface, one end of the memory card is provided with a USB interface, the memory card is slidably received in the receiving groove of the SD card adapter, such that the memory card is detachably connected to the SD card adapter, or the end of memory card having the USB interface protrudes outwardly from the SD card adapter.

Further, the memory card comprises an integrated circuit packaged therein configured for storing data.

Further, the SD card adapter includes an upper cover, one end of the upper cover defines a plurality of spaced connecting grooves; a lower cover, the lower cover is correspondingly arranged to the upper cover; and a plug connector, one side of the plug connector is provided with a plurality of spaced metal strips, the other side of the plug connector is provided with a set of SD connecting fingers, the set of SD connecting fingers are fixed to the plug connector and electrically connected to the metal strips; the set of SD connecting fingers is clamped between the upper cover and the plug connector, and the set of SD connecting fingers are corresponding to arrange in the plurality of spaced connecting grooves to form the SD interface.

Further, the memory card includes an outer frame; a memory module fixed inside of the outer frame, two ends of the memory card are respectively provided with a set of USB connecting fingers and a set of SDIO interface contacts; a cover plate fixed to the end of the memory module having the set of USB connecting fingers, the cover plate defines a set of through holes corresponding to the set of USB connecting fingers at a middle portion thereof; and a set of USB interface contacts received in the set of through holes of the cover plate and are electrically connected to the set of USB connecting fingers to form the USB interface.

Further, the memory card includes a memory module, one end of the memory module is provided with a set of USB connecting fingers to form the USB interface, the other end is provided with a set of SDIO interface contacts; and a cover plate, one end of the cover plate is rotatably connected to the end of the memory module having the set of USB connecting fingers, the cover plate is capable of rotating from one side of the memory module to the other side.

Further, wherein the memory card includes an outer frame; a memory module fixed inside of the outer frame, one end of memory module is provided with a set of USB connecting fingers to form the USB interface, the other end is provided with a set of SDIO interface contacts; and a cover plate, one end of the cover plate is rotatably connected to the end of the outer frame adjacent to the set of USB connecting fingers, the cover plate is capable of rotating from one side of the memory module to the other side.

Further, the cover plate is rotatably connected to the outer frame via a rotating shaft assembly, the end faces of both the cover plate and the outer frame are provided with two lugs spacing to each other, the lug defines a shaft hole.

Further, the rotating shaft assembly comprises two connection blocks and four rotary shafts respectively fixing to the two connection blocks, two rotary shafts located on each connection block extends through the shaft holes of the two adjacent lugs, respectively.

Further, each of the two sides of the end of the cover plate away from the rotating shaft assembly is provided with a latching portion, each of the opposite sides of the outer frame is provided with a mating portion, the latching portion is latched with the mating portion such that the cover plate covers the set of USB connecting fingers.

Further, the side of the cover plate corresponding to the set of USB connecting fingers defines a notch and is provided with a resilient sealing portion surrounding a periphery of the notch, the resilient sealing portion elastically resists against the outer frame or the memory module.

Further, each of two opposite sidewalls of the receiving groove defines a sliding slot, each of two opposite sidewalls of the end of the outer frame adjacent to the set of SDIO interface contacts is provided with a guide protrusion slidably received in the sliding slot.

Further, each of two opposite sidewalls of the opening end of the receiving groove defines a latching groove, each of two opposite sidewalls of the end of the cover plate away from the guide protrusion is provided with an engaging protrusion engaging with the latching groove.

When the memory card of the SD memory card is inserted into the receiving groove of the SD card adapter, the SD interface of the SD card adapter is electrically connected to the set of SDIO interface contacts of the memory card by the metal strip of the plug connector, for the SD card adapter to be inserted into the SD slot to serve as an ordinary SD memory card; when the memory card of the SD memory card is unplugged of the receiving groove of the SD card adapter, the USB interface of the memory card is inserted into the USB slot to serve as an ordinary USB storage device. Hence, the SD memory card is capable of being electrically connected with the USB connection port without the help of a multifunctional card reader.

DETAILED DESCRIPTION OF THE EMBODIMENTS

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
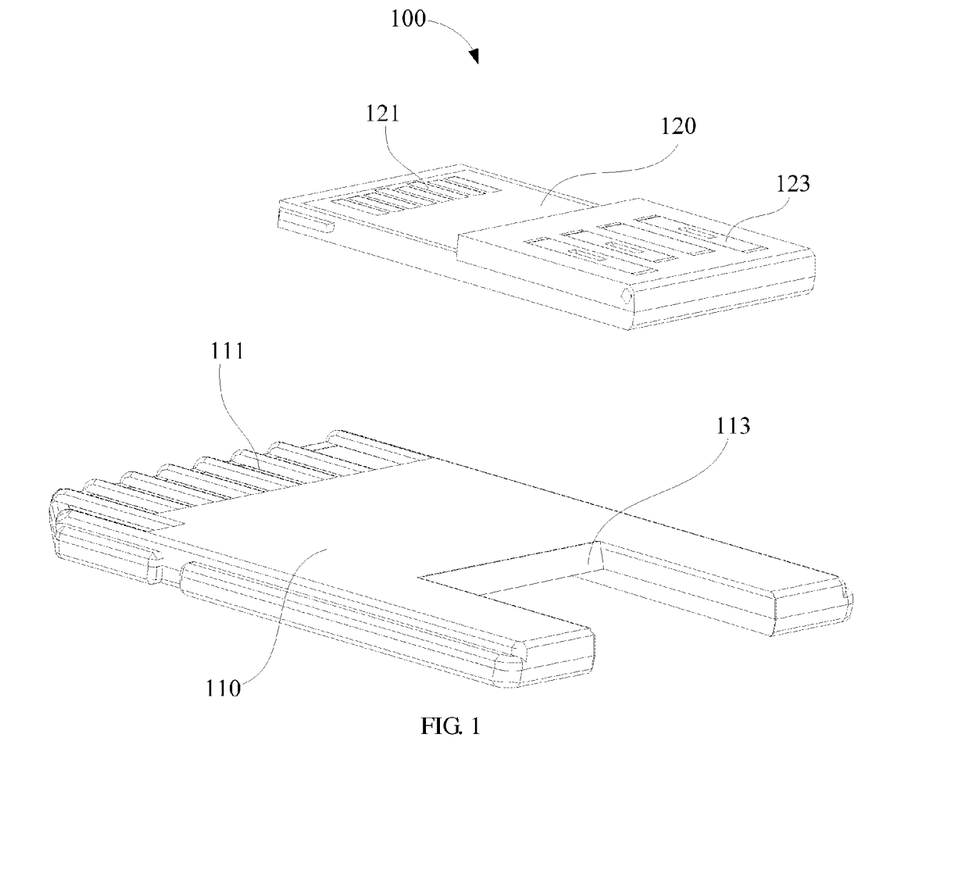
FIG. 1 is a perspective view of an SD memory card according to a first embodiment showing a SD card adapter and a memory card of the SD memory card being separated from each other.

Referring to FIG. 1, a first embodiment of an SD memory card 100 includes an SD card adapter 110 and a memory card 120.

The SD card adapter 110 has a shape of the standard SD card, one end of SD card adapter 110 is provided with an SD interface 111, the other end of SD card adapter 110 defines a receiving groove 113. The memory card 120 is shaped approximately as a rectangle, two ends of the memory card 120 are provided with a set of SDIO interface contacts 121 and a USB interface 123, respectively. The memory card 120 is received in the receiving groove 113 of the SD card adapter 110 such that the set of SDIO interface contacts 121 are electrically connected to the SD interface 111.

When the memory card 120 of the SD memory card 100 is inserted into the receiving groove 113 of the SD card adapter 110, the SD interface 111 of the SD card adapter 110 is electrically connected with the set of SDIO interface contacts 121 of the memory card 120, such that the SD card adapter 110 is inserted into the SD slot to serve as an ordinary SD memory. When the memory card 120 of the SD memory card 100 is unplugged of the receiving groove 113 of the SD card adapter 110, the USB interface 123 of the memory card 120 can be inserted into the USB slot to serve as an ordinary USB storage device.

Figure 2:
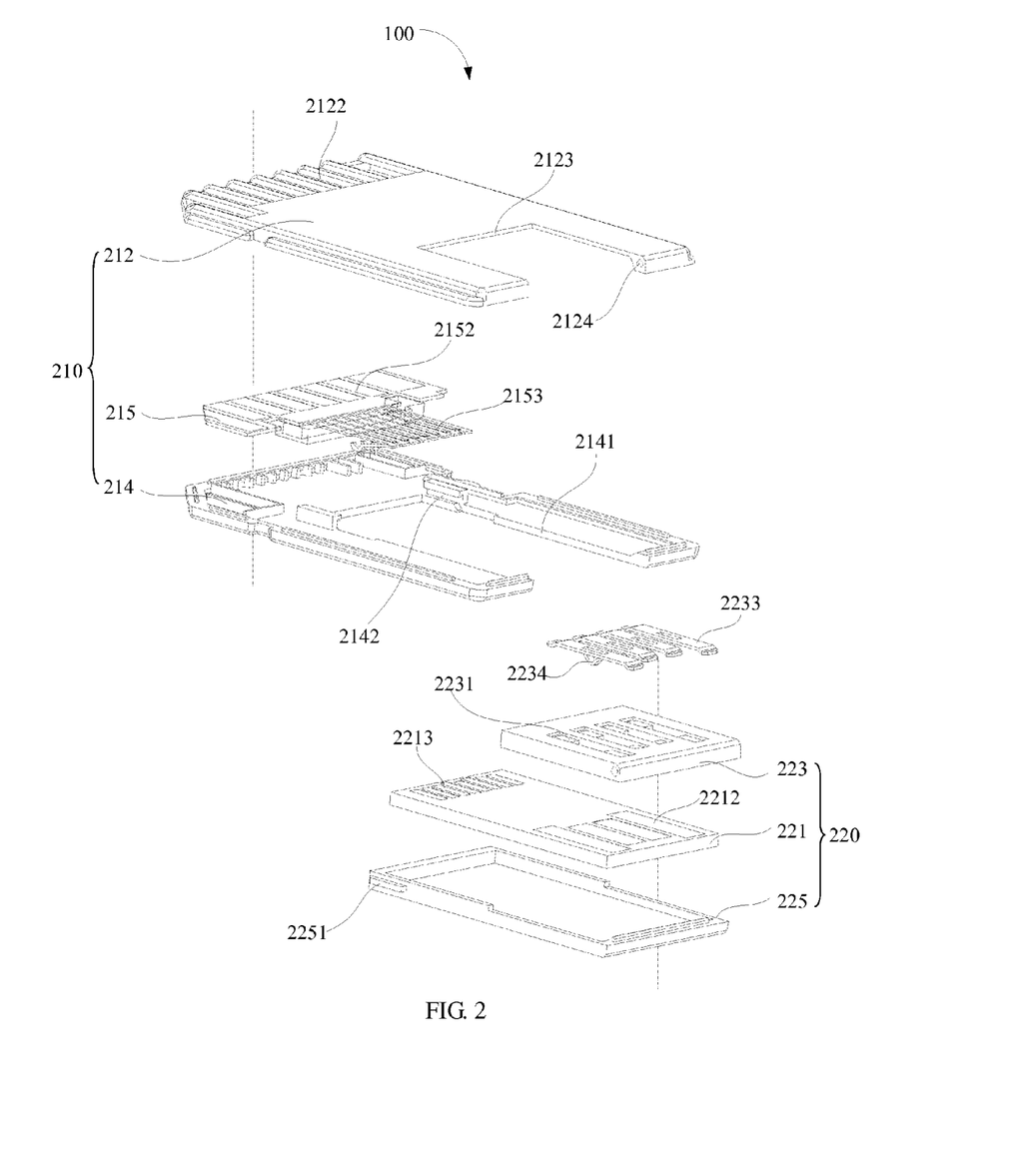
FIG. 2 is an exploded perspective view of an SD memory card according to a second embodiment.

Referring to FIG. 2, a second embodiment of an SD memory card 200 is similar to the SD memory card 100 of the first embodiment, the SD memory card 200 includes an SD card adapter 210 and a memory card 220.

Figure 4:
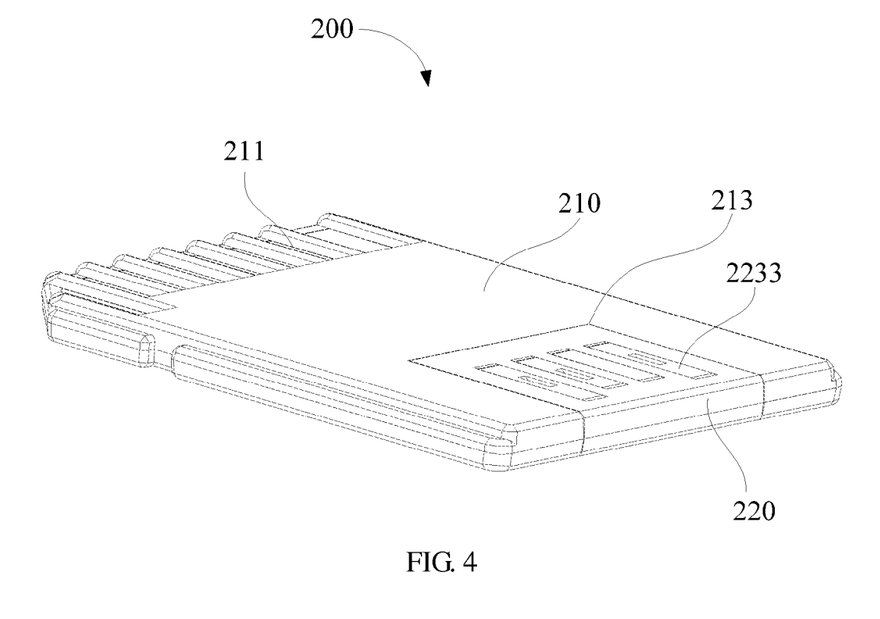
FIG. 4 is a perspective view of the memory card of the SD memory card shown in the FIG. 2 inserted to the SD card adapter.

The SD card adapter 210 includes an upper cover 212, a lower cover 214, and a plug connector 215. One end of the upper cover 212 defines a plurality of spaced connecting grooves 2122, the other end of the upper cover 212 defines a first gap 2123. One end of the lower cover 214 defines a second gap 2141 corresponding to the first gap 2123. The plug connector 215 is provided with a set of SD connecting fingers 2152 and a plurality of metal strips 2153. The plurality of metal strips 2153 are located on the one side of the plug connector 215, and the plurality of metal strips 2153 are spaced from each other. The set of SD connecting fingers 2152 are arranged on the top surface of the plug connector 215 and electrically connected to the plurality of metal strips 2153. Referring also to FIG. 4, the set of SD connecting fingers 2152 are clamped between the upper cover 212 and the plug connector 215, such that the set of SD connecting fingers 2152 corresponds to arrange in the plurality of spaced connecting grooves 2122 of the upper cover 212 to form the SD interface 211. The first gap 2123 and the second gap 2141 cooperatively form the receiving groove 213.

Specifically, in the illustrated embodiment, an integrated circuit (not shown) is packaged inside the memory card 220 configured for storing data.

The memory card 220 includes a memory module 221 and a cover plate 223. One end of memory module 221 is provided with a set of USB connecting fingers 2212, the other end of memory module 221 is provided with a set of SDIO interface contacts 2213. The cover plate 223 is fixed to the end of the memory module 221 having the set of USB connecting fingers 2212, the cover plate 223 is provided with a set of USB interface contacts 2233. The cover plate 223 defines a set of through holes 2231 at a middle portion thereof corresponding to the set of USB connecting fingers 2212. The set of USB interface contacts 2233 are received in the set of through holes 2231, and the set of USB interface contacts 2233 are electrically connected to the set of USB connecting fingers 2212 to form the USB interface (not shown). The set of USB interface contacts 2233 are a set of piece of metal sheets, and the middle portion thereof are dented to form a set of resilient hooks 2234. The set of resilient hooks 2234 abuts against the set of USB connecting fingers 2212.

The memory card 220 further includes an outer frame 225, the memory module 221 is fixed inside of the outer frame 225.

In order to ensure that the memory card 220 is received in the receiving groove 213 and not fall off, each of opposite sidewalls of the receiving groove 213 defines a sliding slot 2142, each of the opposite sidewalls of the end of the outer frame 225 adjacent to the set of SDIO interface contacts 2213 is provided with a guide protrusion 2251 slidably along the sliding slot 2142.

In order to further limit the position of the memory card 220, each of two opposite sidewalls of the opening end of the receiving groove 213 defines a latching groove 2124. Each of opposite sidewalls of the end of the cover plate 223 away from the guide protrusion 2251 is provided with an engaging protrusion 2232 engaging with the latching groove 2124.

Specifically, in the illustrated embodiment, the sliding slot 2142 is located at a bottom end of the lower cover 214 of SD card adapter 210 adjacent to the second gap 2141. The latching groove 2124 is positioned on the opposite sidewalls of the opening end of the first gap 2123 of the upper cover 212.

Figure 3:
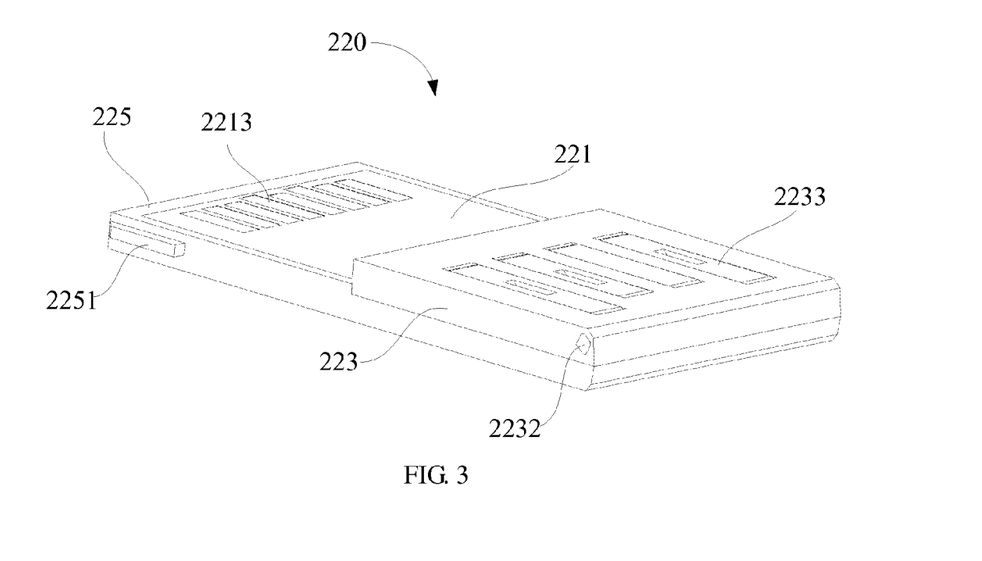
FIG. 3 is a isometric perspective view of the memory card of the SD memory card shown in FIG. 2.
Figure 5:
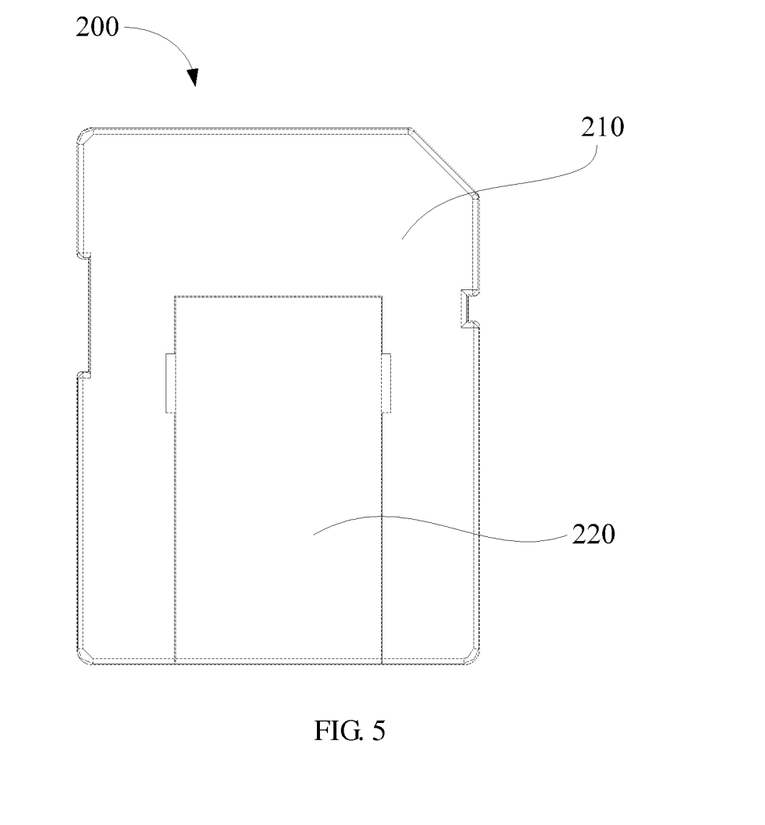
FIG. 5 is a bottom plan view of the SD memory card shown in FIG. 4.
Figure 6:
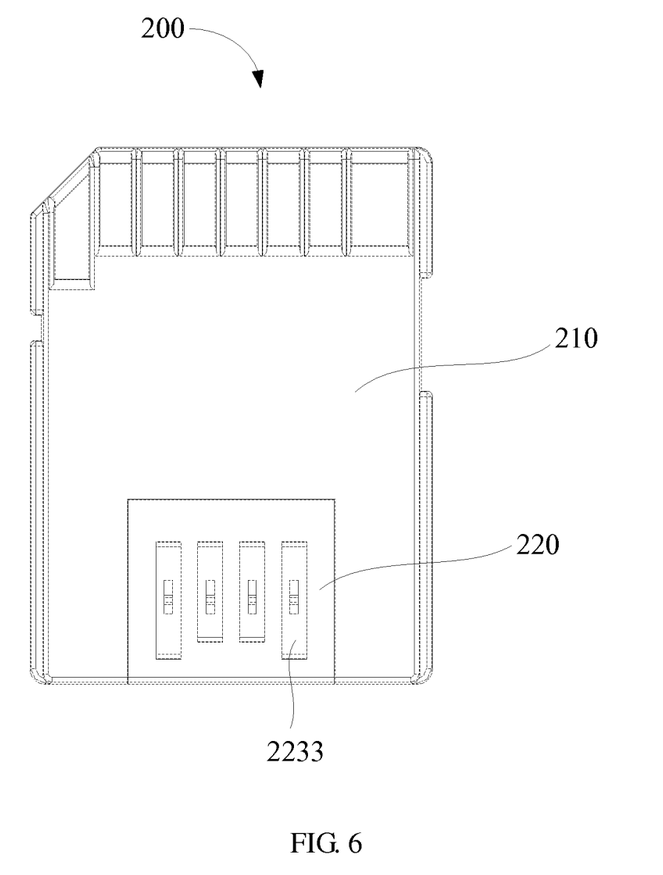
FIG. 6 is a top plan view of the SD memory card shown in FIG. 4.

Referring to FIG. 3, when the memory card 220 is unplugged of the receiving groove 213 of the SD card adapter 210, the memory card 220 is used as an ordinary USB storage device. Referring also to FIG. 4 through FIG. 6, when the memory card 220 is received in the receiving groove 213 of the SD card adapter 210, the SD card adapter 210 is used as an SD memory card.

It should be noted that the outer frame 225 may be omitted, and then guide protrusion 2251 is directly located on the opposite sides of the memory module 221.

It is to be understood that, it is not necessary to completely unplug the memory card 220 from the receiving groove 213 of the SD card adapter 210, as long as the end of the memory card 220 having the set of USB connecting fingers 2212 protrudes outwardly from the SD card adapter 210. At this time, because the end of the memory card 220 having the set of USB connecting fingers 2212 is protruded outwardly from the SD card adapter 210, the USB interface is formed. In addition, since the memory card 220 is not completely detached from the SD adapter 210, the memory card 220 is not prone to be lost.

Figure 7:
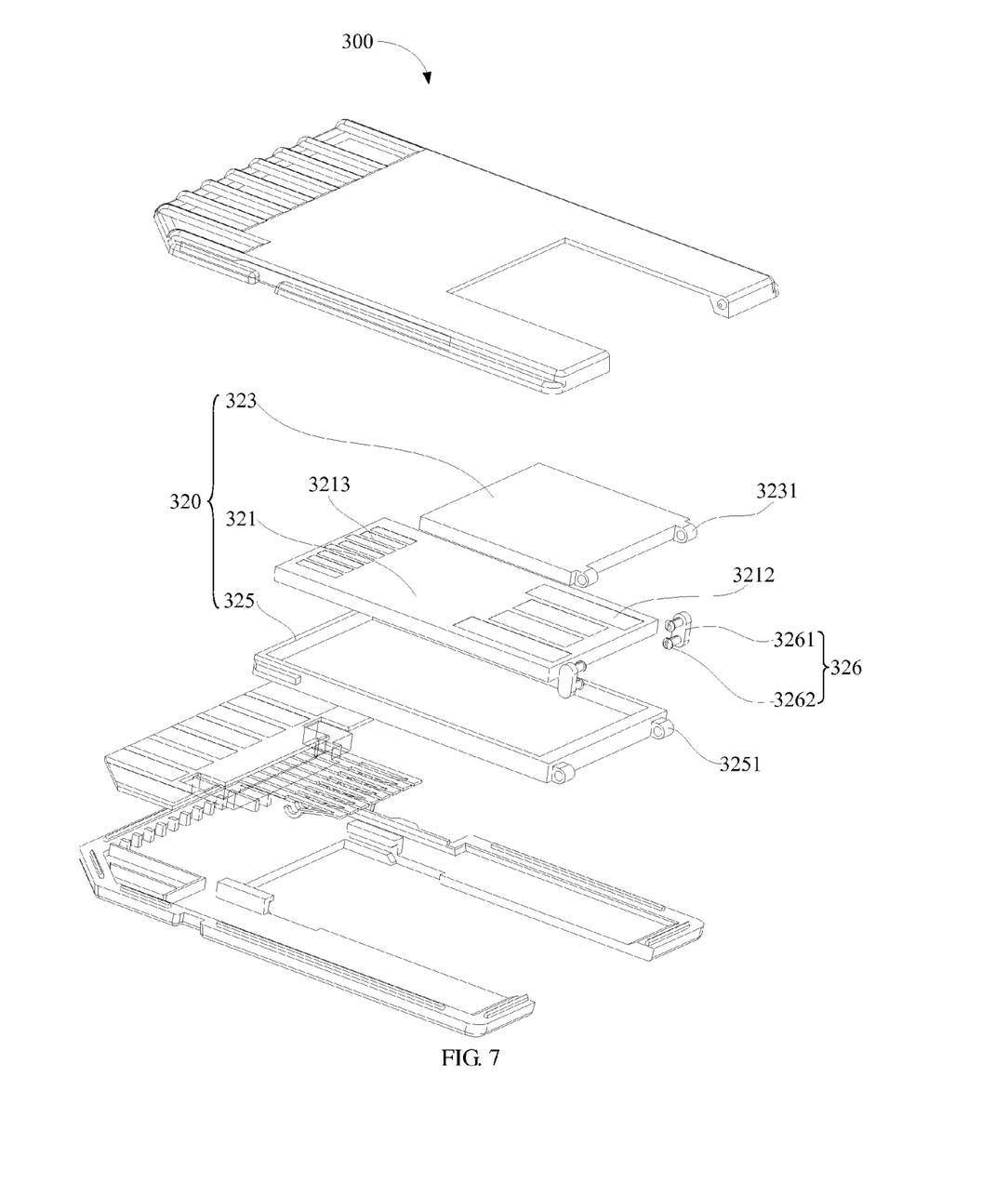
FIG. 7 is an exploded view of an SD memory card according to a third embodiment.
Figure 8:
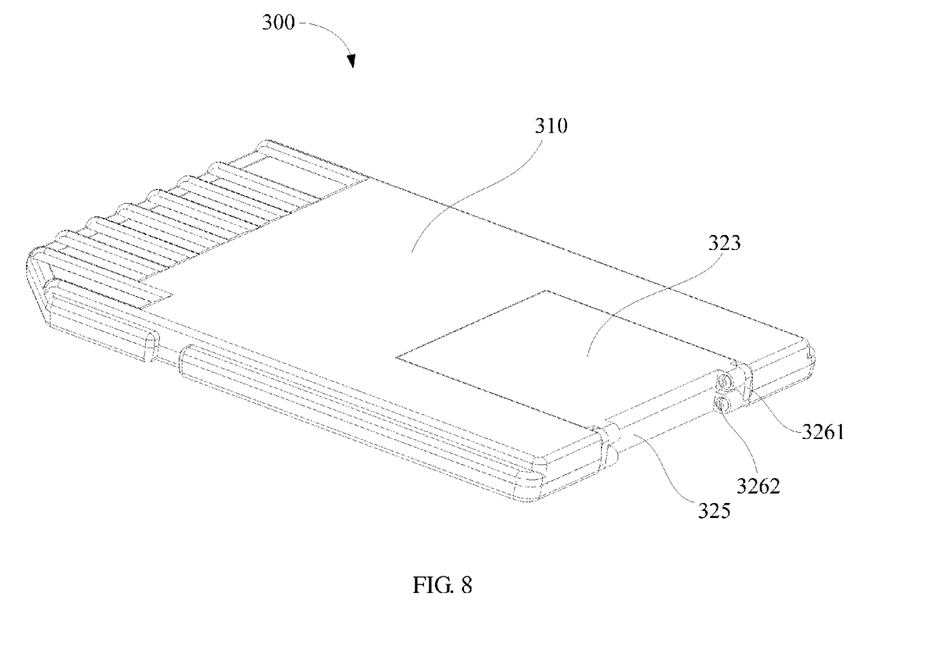
FIG. 8 is a perspective view of the SD memory card shown in the FIG. 7 inserted to the SD card adapter.

Referring to FIG. 7 and FIG. 8, a third embodiment of an SD memory card 300 is similar to the SD memory card 200 of example 2, the difference is that: the memory card 320 of the SD memory card 300 is different from the memory card 220 of the SD memory card 200.

The memory card 320 includes a memory module 321, a cover plate 323 and an outer frame 325.

The memory module 321 is fixed inside the outer frame 323. An integrated circuit (not shown) is packaged inside the memory card 321 configured for storing data. Each of two ends of the memory module 321 is provided with a set of USB connecting fingers 3212 and a set of SDIO interface contacts 3213, respectively. One end of the cover plate 323 is rotatably connected to the end of the outer frame 325 adjacent to the set of USB connecting fingers 3212, such that the cover plate 323 is capable of rotating from one side of the memory module 321 to the other to cover the USB connecting finger 3212.

Specifically, in the illustrated embodiment, the cover plate 323 is rotatably connected to the outer frame 325 via a rotating shaft assembly 326, one end face of the cover plate 323 is provided with two lugs 3231 spacing to each other, one end face of the outer frame 325 is provided with two lugs 3251 spacing to each other, each of the lug 3231 and the lug 3251 defines a shaft hole, respectively (not labeled).

The rotating shaft assembly 326 includes two connection blocks 3261 and four rotary shafts 3262. Each of two rotary shafts 3262 is fixed to one connection block 3261 spacing to each other, each of the two rotary shafts 3262 located on each connection block 3261 extends through the cover plate 323 and the adjacent shaft holes of the memory module 321, respectively.

Further, in order to ensure that the cover plate 323 is capable of rotating to the side of the memory module 321 having the set of USB connecting fingers 3212 to steadily cover the set of USB connecting fingers 3212, each of two sides of the cover plate 323 away from the rotating shaft assembly 326 is provided with an latching portion (not shown), each of the opposite sides of the outer frame 325 is provided with a mating portion, the latching portion is latched with the mating portion such that the cover plate 323 covers the set of USB connecting fingers 3212. For example, both sides of the end of the cover plate 323 away from the rotating shaft assembly 326 are provided with a resilient hook, the two opposite sides of the outer frame 325 are provided with a latching groove engaging with the resilient hook.

Figure 9:
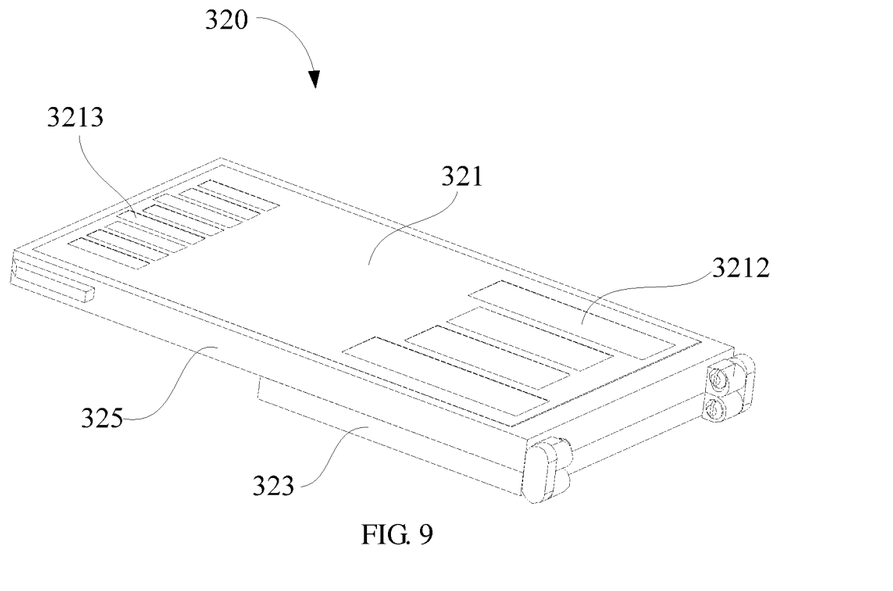
FIG. 9 is a perspective view of the SD memory card shown in the FIG. 7 used as a USB flash disk.

Referring to FIG. 9, when the memory card 320 is used as an USB memory card, the cover plate 323 rotates from the side of the memory module 321 having the set of USB connecting fingers 3212 to the other side to expose the set of USB connecting fingers 3212, and the piled up thickness of the cover plate 323 and the memory module 321 is exactly equal to the height of the USB slot of the external device in this case, such that the memory card 100 can be inserted into the USB slot of the external device for data transmission.

Figure 10:
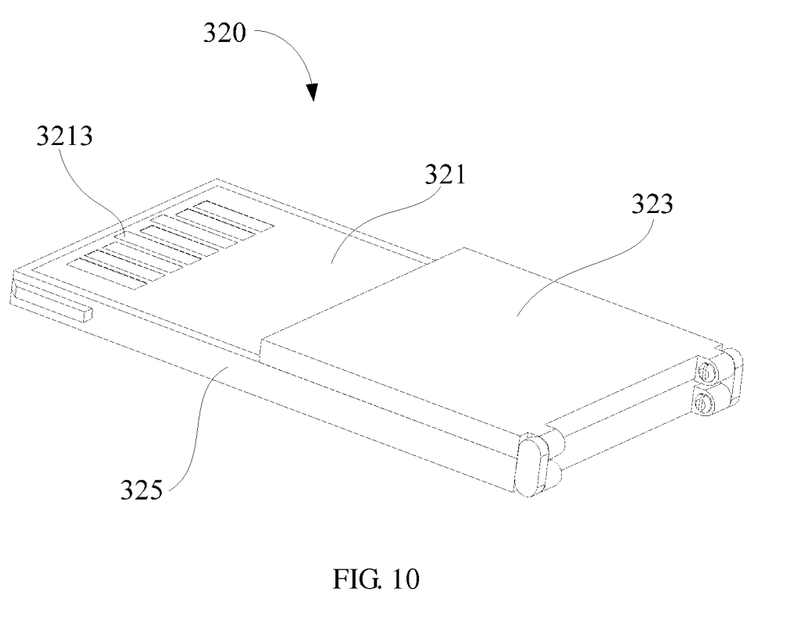
FIG. 10 is a perspective view of the SD memory card shown in the FIG. 7 which is not used as USB flash disk.

Referring to FIG. 10, when the memory card 320 is not in use, the cover plate 323 rotates to the side of the memory module 321 having the set of USB connecting fingers 3212, the latching portion of the cover plate 323 is engaged with the mating portion of the outer frame 325 such that the cover plate 323 may protect the set of USB connecting fingers 3212.

The cover plate 323 of the memory card 320 can rotate from one side to the other side of the memory module 321 to cover the set of USB connecting fingers 3212, thus the set of USB connecting fingers 3212 is protected; and it is not necessary to employ extra housing or cover for the memory card 320 to seal and protect the USB connecting finger 3212, thus the structure is relatively simple and relatively thin.

Furthermore, one end of the memory card 320 is provided with a set of SDIO interface contacts 3213 to electrically connect to the SD interface.

It should be noted that the cover plate 323 is not limited to rotatably connect to the outer frame 325 via the rotating shaft assembly 326, other structures may also be used, such as hinge and the like. The rotating shaft assembly 326 is not limited to include two connection blocks 3261 and four rotary shafts 3262, other structures may also be used, such as two U shape rotary shafts may be used, both end of each U shape rotary shaft extend through the shaft hole of the two adjacent lugs. The outer frame 325 may be omitted, the lug 3251 is directly located on the memory module 321, for the cover plate 323 is rotatably connected to the memory module 321, the mating portion may be directly located on the two sides of the memory module 321.

The cover plate 323 is slidably disposed on the memory module 321, for example, each of two sides corresponding to each other of the memory module 321 defines a sliding slot, each of two sides of one end of the cover plate 323 is provided with a shaft, respectively, the shaft is capable of sliding along the sliding slot, such that the cover plate 323 slides to the top of the set of USB connecting fingers 3212 to cover the set of USB connecting fingers 3212 of the memory module 321. Alternatively, the cover plate 323 is slidably disposed on the side of the memory module 321 opposite to the set of USB connecting fingers 3212, the shaft slides to the end of the sliding slot, the cover plate 323 rotates from one side to the other to cover the set of USB connecting fingers 3212.

It is to be understood that, in order to better protect the set of USB connecting fingers 3212 by the cover plate 323, the side of the cover plate 323 corresponding to the set of USB connecting fingers 3212 defines a notch and an resilient sealing portion surrounding a periphery of the notch, the resilient sealing portion elastically resists against the outer frame 325 or the memory module 321, such that the set of USB connecting fingers 3212 is sealed inside of the notch of the cover plate 323.

Although the present invention has been described with reference to the embodiments thereof and the best modes for carrying out the present invention, it shouldn't be construed as a limitation to the scope of the present invention. It should be noted that a variety of modifications and changes may be made without departing from the scope of the present invention for a person skilled in the art, all of that belong to the scope of protection of the present invention. Therefore, the scope of the present invention is intended to be defined by the appended claims.

What is claimed is:
1. An SD memory card, comprising:
an SD card adapter, one end of the SD card adapter is provided with an SD interface, the other end of the SD card adapter defines a receiving groove; and a memory card, two ends of the memory card are provided with a set of SDIO interface contacts and a USB interface, respectively, wherein the memory card is received in the receiving groove such that the set of SDIO interface contacts are electrically connected to the SD interface;
the memory card further comprises an integrated circuit packaged therein configured for storing data;
the SD card adapter further comprises:
an upper cover, one end of the upper cover defines a plurality of spaced connecting grooves, the other end of the upper cover defines a first gap;
a lower cover, one end of the lower cover defines a second gap corresponding to the first gap; and
a plug connector, one side of the plug connector is provided with a plurality of spaced metal strips, the other side of the plug connector is provided with a set of SD connecting fingers, the set of SD connecting fingers are fixed to the plug connector and electrically connected to the plurality of the metal strips; the set of SD connecting fingers are clamped between the upper cover and the plug connector, and the set of SD connecting fingers are correspondingly to arrange in the plurality of spaced connecting grooves to form the SD interface; the first gap and the second gap cooperatively form the receiving groove.

2. The SD memory card according to claim 1, wherein the memory card comprises:
   an outer frame;
   a memory module, the memory module is fixed inside of the outer frame, one end of memory module is provided with a set of USB connecting fingers, the set of SDIO interface contacts are positioned on the other end of the memory module;
   a cover plate fixed to the end of the memory module having the set of USB connecting fingers, the cover plate defines a set of through holes corresponding to the set of USB connecting fingers at a middle portion thereof; and
   a set of USB interface contacts, the set of USB interface contacts are received in the through holes of the cover plate and are electrically connected to the set of USB connecting fingers to form the USB interface.

3. The SD memory card according to claim 1, wherein the memory card comprises:
   an outer frame;
   a memory module, the memory module is fixed inside of the outer frame, one end of memory module is provided with a set of USB connecting fingers to form the USB interface, the set of SDIO interface contact are positioned on the other end of the memory module; and
   a cover plate, one end of the cover plate is rotatably connected to the end of the outer frame adjacent to the set of USB connecting fingers, the cover plate is capable of rotating from one side of the memory module to the other.

4. The SD memory card according to claim 3, wherein the cover plate is rotatably connected to the outer frame via a rotating shaft assembly, the end faces of both the cover plate and the outer frame are provided with two lugs spacing to each other, the lug defines a shaft hole.

5. The SD memory card according to claim 4, wherein the rotating shaft assembly comprises two connection blocks and four rotary shafts fixing to the two connection blocks, respectively, two rotary shafts located on each connection block extends through the shaft holes of the two adjacent lugs, respectively.

6. The SD memory card according to claim 4, wherein each of the two sides of the end of the cover plate away from the rotating shaft assembly is provided with a latching portion, each of the opposite sides of the outer frame is provided with a mating portion, the latching portion is latched with the mating portion such that the cover plate covers the set of USB connecting fingers.

7. The SD memory card according to claim 2, wherein each of two opposite sidewalls of the receiving groove defines a sliding slot, each of two opposite sidewalls of the end of the outer frame adjacent to the set of SDIO interface contacts is provided with a guide protrusion slidably received in the sliding slot.

8. The SD memory card according to claim 3, wherein each of two opposite sidewalls of the receiving groove defines a sliding slot, each of two opposite sidewalls of the end of the outer frame adjacent to the set of SDIO interface contacts is provided with a guide protrusion slidably received in the sliding slot.

9. The SD memory card according to claim 7, wherein each of two opposite sidewalls of the opening end of the receiving groove defines a latching groove, each of two opposite sidewalls of the end of the cover plate away from the guide protrusion is provided with an engaging protrusion engaging with the latching groove.

10. The SD memory card according to claim 8, wherein each of two opposite sidewalls of the opening end of the receiving groove defines a latching groove, each of two opposite sidewalls of the end of the cover plate away from the guide protrusion is provided with an engaging protrusion engaging with the latching groove.

11. An SD memory card, comprising:
    an SD card adapter, one end of the SD card adapter is provided with an SD interface, and the other end of the SD card adapter defines a receiving groove; and
    a memory card electrically connected to the SD interface, one end of the memory card is provided with a USB interface, wherein the memory card is slidably received in the receiving groove of the SD card adapter, such that the memory card is detachably connected to SD card adapter, or the end of memory card having the USB interface protrudes outwardly from the SD card adapter;
    the memory card further comprises an integrated circuit packaged therein configured for storing data;
    the SD card adapter further comprises:
    an upper cover, one end of the upper cover defines a plurality of spaced connecting grooves;
    a lower cover, the lower cover is correspondingly arranged to the upper cover; and
    a plug connector, one side of the plug connector is provided with a plurality of spaced metal strips, the other side of the plug connector is provided with a set of SD connecting fingers, the set of SD connecting fingers are fixed to the plug connector and electrically connected to the metal strips; the set of SD connecting fingers are clamped between the upper cover and the plug connector, and the set of SD connecting fingers are corresponding to arrange in the plurality of spaced connecting grooves to form the SD interface.

12. The SD memory card according to claim 11, wherein the memory card comprises:
    an outer frame;
    a memory module fixed inside of the outer frame, two ends of the memory card are respectively provided with a set of USB connecting fingers and a set of SDIO interface contacts;
    a cover plate fixed to the end of the memory module having the set of USB connecting fingers, the cover plate defines a through holes corresponding to the set of USB connecting fingers at a middle portion thereof; and
    a USB interface contact received in the through hole of the cover plate and is electrically connected to the USB connecting finger to form the USB interface.

13. The SD memory card according to claim 11, wherein the memory card comprises:
    an outer frame;
    a memory module fixed inside of the outer frame, one end of memory module is provided with a set of USB connecting fingers to form the USB interface, the other end is provided with a set of SDIO interface contacts; and
    a cover plate, one end of the cover plate is rotatably connected to the end of the outer frame adjacent to the set of USB connecting fingers, the cover plate is capable of rotating from one side of the memory module to the other side.

14. The SD memory card according to claim 13, wherein the cover plate is rotatably connected to the, outer frame via a rotating shaft assembly, the end faces of both the cover plate and the outer frame are provided with two lugs spacing to each other, the lug defines a shaft hole.

15. The SD memory card according to claim 14, wherein the rotating shaft assembly comprises two connection blocks and four rotary shafts respectively fixing to the two connection blocks, two rotary shafts located on each connection block extends through the shaft holes of the two adjacent lugs, respectively.

16. The SD memory card according to claim 15, wherein each of the two sides of the end of the cover plate away from the rotating shaft assembly is provided with a latching portion, each of the opposite sides of the outer frame is provided with a mating portion, the latching portion is latched with the mating portion such that the cover plate covers the set of USB connecting fingers.

17. The SD memory card according to claim 12, wherein each of two opposite sidewalls of the receiving groove defines a sliding slot, each of two opposite sidewalls of the end of the outer frame adjacent to the set of SDIO interface contacts is provided with a guide protrusion slidably received in the sliding slot.

18. The SD memory card according to claim 13, wherein each of two opposite sidewalls of the receiving groove defines a sliding slot, each of two opposite sidewalls of the end of the outer frame adjacent to the set of SDIO interface contacts is provided with a guide protrusion slidably received in the sliding slot.

19. They SD memory card according to claim 17, wherein each of two opposite sidewalls of the opening end of the receiving groove defines a latching groove, each of two opposite sidewalls of the end of the cover plate away from the guide protrusion is provided with an engaging protrusion engaging with the latching groove.

20. The SD memory card according to claim 18, wherein each of two opposite sidewalls of the opening end of the receiving groove defines a latching groove, each of two opposite sidewalls of the end of the cover plate away from the guide protrusion is provided with an engaging protrusion engaging with the latching groove.

* * * * *